United States Patent [19]

Rapp

[11] 4,425,708

[45] Jan. 17, 1984

[54] RELAY CUTTING TOOL

[75] Inventor: Willard E. Rapp, Franklin Township, Somerset County, N.J.

[73] Assignee: Western Electric Company, Inc., New York, N.Y.

[21] Appl. No.: 288,580

[22] Filed: Jul. 30, 1981

[51] Int. Cl.³ .............................................. B23P 19/00

[52] U.S. Cl. ........................................ 30/133; 29/764; 30/210; 30/228

[58] Field of Search ................. 30/228, 252, 133, 189, 30/500, 180, 131, 182, 209, 210; 29/764, 762; 140/123

[56] References Cited

U.S. PATENT DOCUMENTS

| | | | |
|---|---|---|---|
| 2,074,239 | 3/1937 | Rush | 30/252 |
| 2,544,461 | 3/1951 | Leitzel . | |
| 2,617,459 | 11/1952 | Evans | 30/131 X |
| 3,091,841 | 6/1963 | Wurzel | 29/229 |
| 3,217,407 | 11/1965 | Azar | 30/133 |
| 3,699,640 | 10/1972 | Cranston | 29/471.1 |
| 3,893,237 | 7/1975 | Jahnke | 30/180 X |
| 4,117,590 | 10/1978 | Rapp | 29/762 |

*Primary Examiner*—E. R. Kazenske
*Assistant Examiner*—Douglas D. Watts
*Attorney, Agent, or Firm*—A. M. Tobia; D. J. Kirk

[57] ABSTRACT

A power operated tool (20) functions to cut and collect a multitude of precious metal contacts (11,11) from wire spring relays (10). The tool (20) includes a pair of jaws (31,32) that in the open position fit over several rows of contacts (11,11). When the tool (20) is energized, the jaws (31,32) are snapped shut thereby severing the contacts (11,11) from the relays (28). The jaws (31,32) in the closed engaged position define a closed chamber (41) having a port (44) for attachment to a vacuum source for sucking the severed contacts (11,11) into a collection vessel. The jaws (31,32) reopen following collection and the tool (20) is ready to cut the next set of spring contacts (11,11).

11 Claims, 7 Drawing Figures

RELAY CUTTING TOOL

TECHNICAL FIELD

The invention relates to a tool for cutting contacts from wire spring relays and, more particularly, to a power-operated tool for simultaneously cutting and collecting a multitude of contacts from wire spring relays.

BACKGROUND OF THE INVENTION

Wire spring relays are equipped with a plurality of closely spaced, generally parallel contacts composed of precious metals such as platinum and gold. The relays are generally used in telephone switching equipment in which they are mounted onto large frames in closely packed arrays. When these frames and relays are no longer of use they are sold in the scrap metal market. Until the present invention it was not commercially feasible to recover the precious metal contacts from the relays for subsequent refining of the precious metal due to difficulty in the removal of the contacts from the relays while mounted in the frame. Further, the high cost involved in first detaching the relays from frames rendered this alternative economically prohibitive.

Clearly, it would be advantageous to provide a simple, inexpensive, power-operated tool capable of removing a multitude of wire spring relay contacts in a single operation while the relay is still mounted in the frame.

SUMMARY OF THE INVENTION

The invention comprises a tool for cutting and collecting a plurality of contacts from wire spring relays simply, inexpensively and efficiently. The tool utilizes means, movable between a pre-engagement and engagement position, for cutting the object upon engagement therewith. Means, cooperating with the cutting means when said cutting means is engaged with the object, are provided for forming an enclosed collection chamber within the tool for receiving and holding the cut object. Additionally, the tool includes means for urging the cutting means into engagement so as to enable the object to be cut thereby and means responsive to the urging means for returning the cutting means to the pre-engagement position.

DETAILED DESCRIPTION

Figure 4:
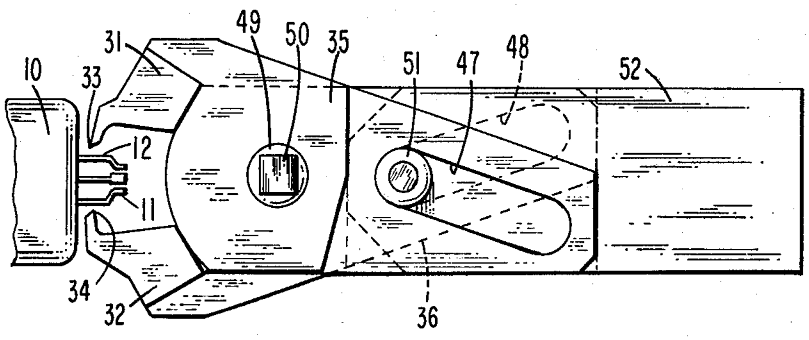
FIG. 4 is a top plan view of the jaws of the cutting tool, removed from the tool, while in the open position.

Referring first to FIG. 4, typically, a wire spring relay 10 comprises a plurality of precious metal contacts 11,11 mounted at the ends of a plurality of springs 12,12. As noted above, the relays 10 are mounted onto large frames (not shown) with the contacts facing out and protected with plastic shields. When these frames are no longer of use the entire frame plus relays 10 are sold in the scrap metal market. The precious metal contacts 11,11 are either lost in the bulk metal or have to be retrieved from the disassembled frames at a later time, at a prohibitive cost.

As will be appreciated from the description which follows, this invention provides a tool that can easily and inexpensively sever and collect the contacts 11,11 from frame mounted relays 10 with a minimum of bulk metal contamination, so that the precious metal of the contacts can thereafter be recovered.

Figure 1:
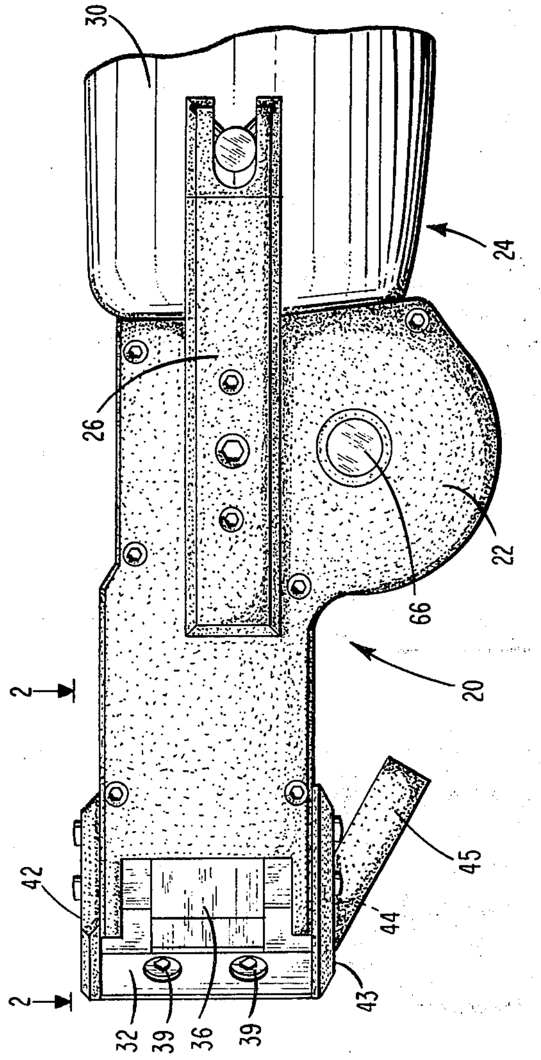
FIG. 1 is a side elevational view of a power operated relay cutting tool, with a portion of the drill removed, which constitutes the preferred embodiment of the invention.
Figure 2:
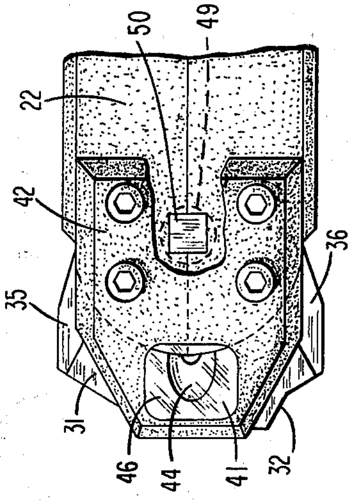
FIG. 2 is a top plan view along the lines 2—2 of FIG. 1.

Referring now to FIGS. 1 and 2, there is shown a tool 20 in accordance with the invention for cutting and collecting contacts 11,11 from wire spring relays 10 (see FIG. 4). The tool 20 includes a housing 22 which, as shown, is attached to a conventional drive mechanism, e.g., a power-operated drill 24, such as a Sears Model No. 315.105 10, $\frac{3}{8}$-inch portable drill or any other commercially-available, power-operated drill or rotary drive mechanism. Alternatively, a manual drive (not shown) may be employed.

The housing 22 of the tool 20 includes mounting brackets 26,26 (only one of which is shown) which serve to secure the housing to the frame 30 of the power operated drill 24 such that the tool housing 22 extends forwardly of the drill frame.

Figure 3:
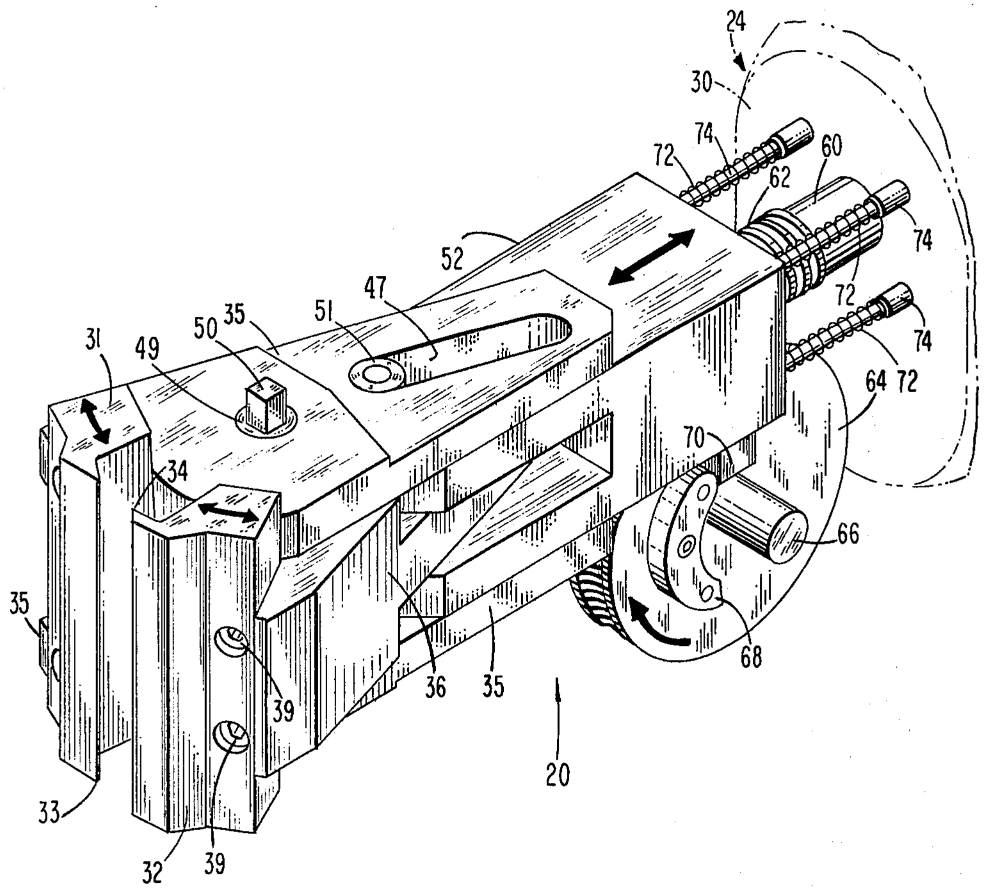
FIG. 3 is a perspective view of the relay spring cutting tool of FIG. 1 absent the housing.

Turning to FIG. 3, the tool 20 further includes a pair of jaws 31,32 for cutting the contacts 29 from the springs 12—12. The jaws 31,32 are movable between a pre-engagement or open position (FIG. 4) and an engagement or closed (FIG. 6) position. Preferably, the jaws 31,32 have cutting edges 33,34, respectively that face each other in the pre-engagement position and which fit over the rows of spring contacts 11,11 of the relay 10 to be cut from the springs 12,12. Removable fasteners, such as screws 39, are used to attach the jaws 31,32 and their cutting edges 33,34 to jaw support arms 35,35,36 to facilitate removal of the jaws so that the cutting edges can be easily sharpened.

Figure 6:
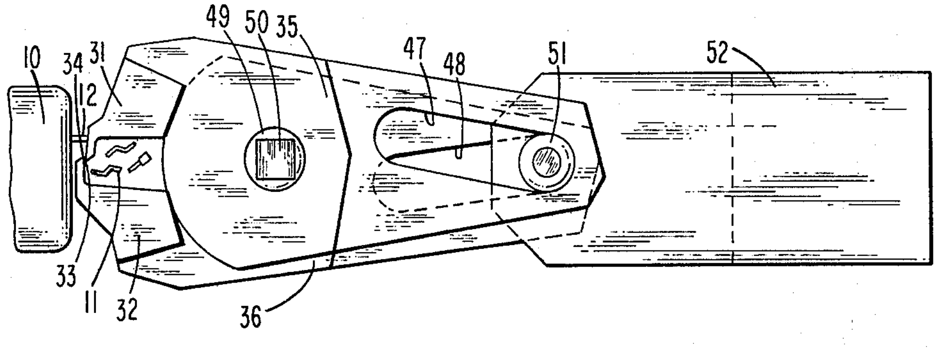
FIG. 6 is a top plan view of the jaws of the cutting tool, removed from the tool, while in the closed position.

As best seen in FIG. 6, the cutting edges 33,34 overlap when the jaws 31,32 are moved into the closed position and are tapered so that the cutting action is scissor-like. When fully engaged, the jaws 31,32 sever the contacts 11,11 of about 40 springs 12,12 in a single operation by merely activating the power drill 24. Additionally, when the jaws 31,32 are fully engaged, a chamber 41 (see FIG. 2) is formed such that the cut objects, i.e., the contacts 11,11, are collected therein.

As best seen in FIGS. 1 and 2, the chamber 41 is formed by the cooperation of an upper and lower cover, 42 and 43, respectively, with the jaws 31,32. The covers 42,43 are attached to the housing 22 by suitable fasteners. However, as will be readily appreciated by those skilled in the art, the jaws 31,32 could be shaped so that they form the chamber 41 in the closed position without the need for the covers 42,43.

The chamber 41 is connected to a vacuum source (not shown) through a port 44 (see FIG. 2). A vacuum exerted at the port 44 sucks out the severed contacts 11,11 from the chamber 41 and delivers them to a collection vessel (not shown) via conduit 45; thereby minimizing loss of the small and numerous contacts and expediting the collection process. A glass viewing port 46, is located in the upper cover 42 so that the operator can accurately position the tool over the contacts 11,11 to be cut.

As best seen in FIGS. 3 and 4, the first jaw 31 of the pair of jaws has a pair of spaced, longitudinally extending arms 35,35 each having a cam slot 47, therethrough. The second jaw 32 has a single centrally placed support arm 36 which also includes a cam slot 48, and is positioned between the arms of the first jaw 31.

The jaws 31,32 are affixed to the housing 22 and to each other by a pivot pin 49 having square ends 50,50 (only one of which is shown). A follower pin 51 located through the cam slots 44,47, and 48 of each arm is attached to a linearly movable element, hereinafter referred to as a cam slot guide 52. When the cam slot guide 52 carries the follower pin 51 rearward along the cam slots 47,47 and 48 (i.e., toward the right as viewed in FIG. 4 and from the position in FIG. 4 to the position in FIG. 6) the respective jaw support arms 35,35, and 36 are moved in opposite directions thereby causing the jaws 31,32 to be pivoted about the pin 49 so that they forcibly close the cutting edges 33,34. More specifically, during rearward movement, the arms 35,35 of the first jaw 31 are caused to pivot counterclockwise about the pin 49, while the arm 36 of the second jaw 32 is caused to pivot clockwise thereabout. When the follower pin 51 is moved forward along the cam slots, 47,47 and 48 (i.e., toward the left as viewed in FIG. 6 and from the position in FIG. 6 to that of FIG. 4), the respective arms 35,35, and 36 are moved in reverse so as to cause the jaws 31,32 to pivot into the open position.

Figure 5:
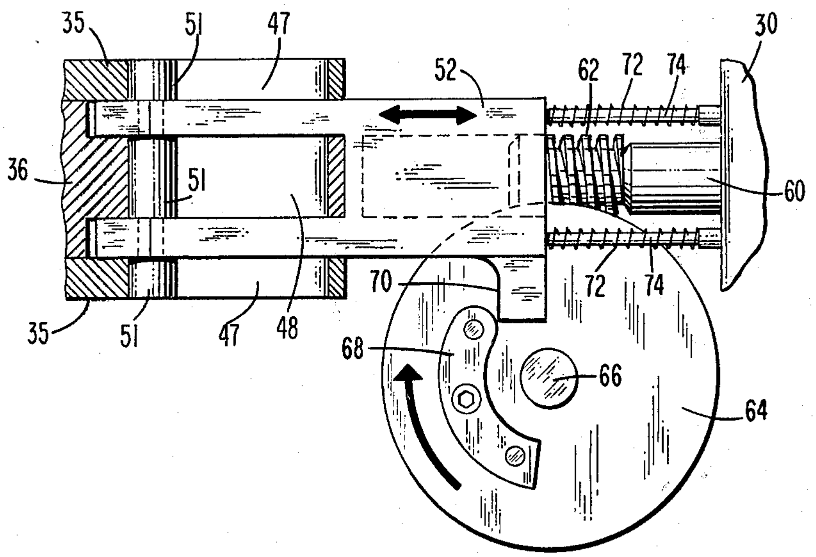
FIG. 5 is an elevational, partial cross-sectional view of the rear portion of the tool of FIG. 1 absent the housing and showing the relationship of the urging means and returning means when the jaws are in the open position as shown in FIG. 4.
Figure 7:
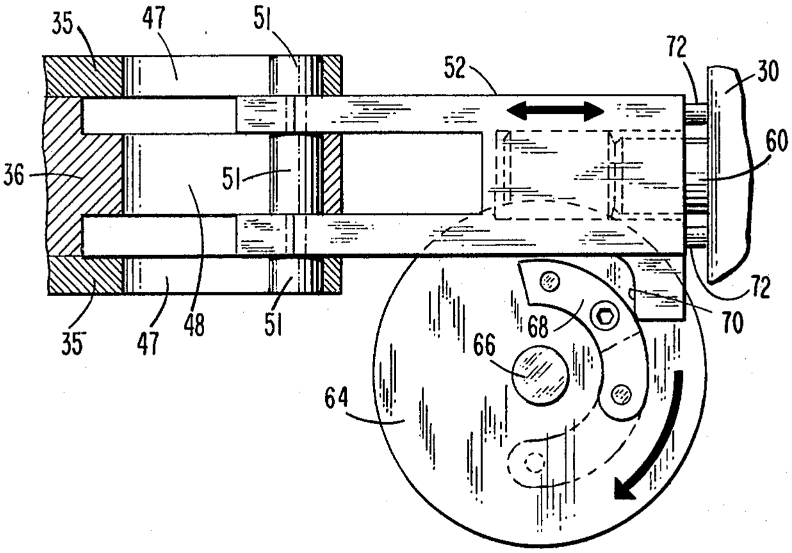
FIG. 7 is an elevational, partial cross-sectional view of the rear portion of the tool of FIG. 1 absent the housing and showing the relationship of the urging means and returning means when the jaws are in the closed position as shown in FIG. 6.

As best seen in FIGS. 3, 5 and 7 the cam slot guide 52 is urged rearward by the movement of a worm wheel 64. The worm wheel 64 is mounted on a shaft 66 rotatably affixed to the housing 22. The worm wheel 64 is driven by a worm 62 which is continuously rotated by a spindle 60 of the power drill 24. A pair of cams 68,68 (only one of which is shown) are mounted onto each side of the worm wheel 64. The cams 68,68 drive a pair of cam followers 70,70 (only one of which is seen), which depend from and form part of the cam slot guide 52. The cams 68,68 drive the cam followers 70,70 rearward as the worm wheel 64 is rotated by the worm 62. The resulting rearward motion of the cam slot guide 52 pulls the follower pin 50 rearward resulting in the jaws 31,32 forcibly moving together so that the cutting edges 33,34 cut the metal contacts 11,11 of the relay 28 (FIG. 4) from the springs 12,12. Preferably the cams 68,68 are circumferentially elongated so that the cam slot guide 52 is briefly held in the rearward position while the worm wheel 64 fully rotates the cams 68,68 past the cam followers 70,70. This keeps the cutting edges closed for a sufficient time to allow the vacuum to suck the severed contacts 11,11 into a bag or other suitable collection vessel.

The mechanism for returning the jaws 31,32 to the open position includes a set of biased compression springs 72 supported by guide pins 74 positioned between the housing 30 of the drill 24 and the cam slot guide 52. The springs 72 are compressed by the rearward movement of the cam slot guide 52 as the guide is driven rearward by the cams 68,68 and the jaws 31,32 are moved into the closed position. After the cams 68,68 pass over the cam followers 70,70 the rearward pressure is removed and the springs 72 return to the relaxed position thereby driving the cam slot guide 52 forward. The forward motion moves the follower pin 50 forward along the cam slots 37,37, and 38. The jaw support arms 35,35, and 36 are then moved in opposite directions causing the jaws 31,32 to pivot into the open position (FIGS. 4 and 5). The jaws 31,32 are then ready to be positioned over the next set of contacts 11,11 to be cut.

It should now be apparent that in accordance with this invention precious metal contacts can rapidly, efficiently and easily be severed and collected from wire spring relays mounted onto large frames. The tool is simple to use and relatively inexpensive to make. It severs a plurality of contacts in a single operation without the need for an operator to learn special skills. Because of the collection chamber and vacuum system none of the precious metal is lost and recovery costs are minimized.

Further, although the invention has been described and illustrated as being used to sever precious metal contacts from wire spring relays, it should be apparent that its use is not so limited and that the invention is readily adaptable to cutting and collecting other articles.

Numerous other modifications may be readily devised by those skilled in the art which will embody the principles of the invention and fall within the spirit and scope thereof.

What is claimed is:

1. A tool for cutting and collecting an object comprising:

(a) a housing;

(b) a cutting means including a pair of jaws each having a cutting edge attached thereto, movable between a pre-engagement position and an engagement position, for cutting the object upon engagement therewith, said jaws are movably mounted so that each cutting edge faces the cutting edge of the associated jaw, so that when the jaws are moved into the engaged position the cutting edges of the jaws are caused to overlap;

(c) means, cooperating with the cutting means when said cutting means is engaged with the object, for forming an enclosed collection chamber for receiving and holding the cut object;

(d) the pair of jaws comprises a first jaw having a single arm and a second jaw having a pair of arms, each arm having a cam slot therein, the arm of the first jaw fitting between the arms of the second jaw;

(e) means for urging the first and second jaws into overlapping engagement so as to cut the object; and (f) means responsive to the urging means for returning the first and second jaws of the cutting means to the pre-engagement position.

2. A tool as recited in claim 1 wherein the urging means and the returning means are coupled to the pair of jaws by a follower pin through the cam slots.

3. A tool for cutting and collecting an object comprising:

(a) a housing;

(b) means, movable between a pre-engagement and an engagement position for cutting the object upon engagement therewith;

(c) means, cooperating with the cutting means when said cutting means is engaged with the object, for forming an enclosed collection chamber for receiving and holding the cut object;

(d) means for urging the cutting means into engagement so as to enable the object to be cut thereby, said urging means comprising:

(1) a rotary drive means;

(2) motion converting means coupled to the rotary drive means for converting the rotary motion to linear motion;

(3) means for coupling the cutting means to the motion converting means; and (e) means responsive to the urging means for returning the cutting means to the pre-engagement position.

4. A tool as recited in claim 3 wherein the rotary drive means is a drill.

5. A tool as recited in claim 3 wherein the motion converting means comprises:

a worm gear coupled to the drill, a cam mounted on the worm wheel of the worm gear; and a linearly movable element having a cam follower thereon, said cam follower being movable by the cam.

6. A tool for cutting and collecting an object, comprising:

(a) a housing;

(b) means, movable between a pre-engagement and an engagement position, for cutting the object upon engagement therewith;

(c) means, cooperating with the cutting means when said cutting means is engaged with the object, for forming an enclosed collection chamber, within the tool, for receiving and holding the cut object;

(d) means for urging the cutting means into engagement so as to enable the object to be cut thereby; and (e) means responsive to the urging means for returning the cutting means to the pre-engagement position, comprising:

(1) a spring biasing means;

(2) a linearly movable element;

(3) said spring biasing means is mounted between the linearly movable element and the housing, the linearly movable element being responsive to the spring biasing means and coupled to the cutting means.

7. A tool as recited in claim 6 wherein the spring biasing means is responsive to the means for urging the cutting means into the engaged position.

8. A tool for cutting and collecting an object comprising:

(a) a drill having a rotary output; and (b) a cutting tool coupled to the output of the drill, the cutting tool further comprising:

(i) motion converting means coupled to the drill for converting the rotary motion of the drill to linear motion of a linearly movable element of the cutting tool;

(ii) means movable between a pre-engagement and engagement position for cutting the object upon engagement therewith, said means activated through movement of the linearly movable element; and (iii) means, cooperating with the cutting means when said cutting means is engaged with the object, for forming an enclosed collection chamber for receiving the cut object.

9. The tool as recited in claim 8 wherein the drill is power operated.

10. The tool as recited in claim 8 wherein the means for cutting is a pair of associated movable cutting jaws, each jaw having a cutting edge which, when the jaws are caused to be in a closed position, overlap the cutting edge of the associated jaw.

11. A tool for cutting and collecting an object comprising:

(a) a housing;

(b) means, movable between a pre-engagement and engagement position, for cutting the object upon engagement therewith;

(c) means, cooperating with the cutting means when said cutting means is engaged with the object, for forming an enclosed collection chamber for receiving and holding the cut object;

(d) means for urging the cutting means into engagement so as to enable the object to be cut thereby, said urging means comprising an elongated cam for keeping the cutting means briefly in the engaged position before actuating the return means; and (e) means responsive to the urging means for returning the cutting means to the pre-engagement position.

* * * * *